(12) United States Patent
Handa et al.

(10) Patent No.: US 7,995,222 B2
(45) Date of Patent: Aug. 9, 2011

(54) PRINTER

(75) Inventors: Yuji Handa, Tachikawa (JP); Katsuyoshi Suzuki, Akiruno (JP); Hirotaka Kuronuma, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1182 days.

(21) Appl. No.: 11/717,874

(22) Filed: Mar. 14, 2007

(65) Prior Publication Data

US 2007/0217849 A1 Sep. 20, 2007

(30) Foreign Application Priority Data

Mar. 17, 2006 (JP) ................................. 2006-075540

(51) Int. Cl.
*G06F 15/00* (2006.01)
*B41J 5/30* (2006.01)

(52) U.S. Cl. ........................................ 358/1.13; 400/62

(58) Field of Classification Search .................. 358/1.13, 358/1.14, 1.15, 1.16, 1.18, 1.1, 1.19, 406, 358/487, 3.24, 504, 1.9; 399/177, 429, 200, 399/202; 400/62, 207, 613; 235/462.1, 462.22; 382/162, 100

See application file for complete search history.

(56) References Cited

U.S. PATENT DOCUMENTS

| 4,839,742 | A | 6/1989 | Nakatani et al. |
| 2002/0075513 | A1 | 6/2002 | Yogome et al. |
| 2004/0184052 | A1* | 9/2004 | Sugiyama et al. ............ 358/1.9 |

FOREIGN PATENT DOCUMENTS

| CN | 2611149 Y | 4/2004 |
| EP | 0 577 271 A2 | 1/1994 |
| JP | 63-95952 A | 4/1988 |
| JP | 63-125340 A | 5/1988 |
| JP | 1-264871 A | 10/1989 |
| JP | 5-2957 U | 1/1993 |
| JP | 7-047714 A | 2/1995 |
| JP | 7-164680 A | 6/1995 |
| JP | 8-018745 A | 1/1996 |
| JP | 2000-076372 A | 3/2000 |
| JP | 2001-353938 A | 12/2001 |

OTHER PUBLICATIONS

Chinese Office Action dated Mar. 13, 2009 (7 pages), and English translation thereof (12 pages), issued in counterpart Chinese Application Serial No. 200710088371.X.

Japanese Office Action dated Sep. 21, 2010 (and English translation thereof) in counterpart Japanese Application No. 2006-075540.

* cited by examiner

*Primary Examiner* — Saeid Ebrahimi Dehkordy
(74) *Attorney, Agent, or Firm* — Holtz, Holtz, Goodman & Chick, PC (57) ABSTRACT

A printer having a first printing mode in which information is printed in a normal image on a general printing tape and a second printing mode in which information is printed in a mirror image on a transfer tape. When the printer prints a two-dimensional code symbol image 40b in the second printing mode on the transfer tape 31b, the printer also prints a two-dimensional code symbol image 40a in the normal image in an area of the transfer tape next to its area in which the symbol image is printed in the mirror image. At this time, an additional confirmative indication 42 is printed close to the symbol image 40a printed in the normal image to indicate that this symbol image should be used only for confirming the content of the symbol image printed in the mirror image.

13 Claims, 9 Drawing Sheets

PRINTER

BACKGROUND OF THE INVENTION

1. Field of the Invention

The present invention relates to printers having normal and mirror image printing functions.

2. Background Art

Published Unexamined Japanese Patent Application Hei 7-164680 discloses a printer capable of printing information in a mirror image on a printing tape. In this printer, a printing mode setting member is provided on a tape cassette that encloses a printing tape to set a printing mode corresponding to the type of the tape, and a printing mode determining member corresponding to the printing mode setting member is provided in the printer to determine whether the printing tape enclosed within the cassette should be printed in a mirror printing mode or in a normal image printing mode.

According to this printer, if the printing tape enclosed within the tape cassette corresponds to the mirror image printing, the printer sets the mirror image printing mode automatically to print a mirror image on the printing tape.

When any particular information is printed in a mirror image on a transfer tape for transfer to an object, a resulting mirror image appears as a reversal of a normal printed image. Thus, it is difficult to accurately confirm the content of the printed mirror image. Assume that a symbol image of barcodes or two-dimensional codes is printed in a mirror image. In this case, even if a user tries to read information contained in the symbol image and then confirm its content before transferring it to an object, using a mobile telephone having a two-dimensional code reading function, the mobile telephone can only read a symbol image printed in the normal image and cannot deal with a symbol image printed in the mirror image. Thus, the content of the printed mirror image cannot be confirmed.

SUMMARY OF THE INVENTION

It is therefore an object of the present invention to provide a printer capable of printing information in a mirror image and confirming the content of the printed mirror image easily.

In order to achieve the above object, according to the present invention there is provided a printer comprising: a printing unit that prints first information on a printing medium; and a print controller that controls the printing unit in accordance with a print command so as to print the first information in a mirror image and also prints at least part of the first information in a normal image.

According to the present invention, the first information is printed in the mirror image in accordance with a print command and at least a part of the first information is printed in a normal image. Thus, there is no problem that the printed content is difficult to confirm as when only a mirror image is printed, and the content of the printed mirror image can be confirmed easily with the aid of the normal image printed together with the mirror image. Especially, when a symbol image of two-dimensional codes should be printed in a mirror image, it sometimes occurs that a reader cannot read the content of a symbol image of two-dimensional codes and that the user cannot confirm the content of the symbol image. However, according to the present invention, the symbol image of two-dimensional codes is printed in the mirror image as well as in the normal image. Thus, by reading the printed normal image with the reader, the content of the printed symbol image can confirmed easily.

The printer preferably further comprises a print number setting unit that sets the number of items of first information to be printed; and wherein: the print controller controls the printing unit to print the first information in the mirror image by the number of items of first information set by the print number setting unit, and to print at least one item of the first information in the normal image.

In the printer, the print controller preferably adds to the first information to be printed in the normal image second information indicating that the first information to be printed in the normal image should be for confirming the content of the first information, and then causes the printing unit to print resulting information in the normal image.

In the printer, the print controller may also cause the printing unit to print in the normal image the whole first information to be printed in the mirror image or cause the printing unit to print in the normal image a part of the first information to be printed in the mirror image.

In the printer, the print controller may reduce the size of at least a part of the information to be printed and causes the printing unit to print resulting information in the normal image in an area smaller than an area where the first information to be printed is printed in the mirror image.

In the printer, the first information to be printed may involve a symbol image of predetermined codes, and wherein the print controller comprises: a dot pattern data producing unit that produces dot pattern data indicative of a symbol image of the predetermined codes; a data pattern data supply unit that supplies to the printing unit the dot pattern data produced by the dot pattern data producing unit; and an inverting unit that inverts the dot pattern data upside down when the dot pattern data is supplied by the data supply unit to the printing unit for mirror image printing.

The printer may further comprise: a printing mode setting unit that selectively sets a mirror image printing mode for mirror image printing or a normal image printing mode for normal image printing, and wherein: the print controller controls the printing unit in accordance with a print command when the mirror image printing mode is set by the printing mode setting unit to print the first information in the mirror and normal images, and controls the printing unit in accordance with a print command when the normal image printing mode is set by the printing mode setting unit to print the first information in the normal image.

The printer may further comprise: a sensing unit that senses the kind of a printing medium loaded in the printer to cause the printing unit to print the first information on the printing medium; and a determining unit that determines based on information on the kind of printing medium sensed by the sensing unit whether the printing medium loaded in the printer is suitable for the mirror image printing, and wherein: the print controller is responsive to the print mode setting unit setting the mirror image printing mode and the determining unit determining that the printing medium loaded is suitable for the mirror printing to control the printing unit so as to print the first information in the mirror and normal images.

In the printer, the print controller may be responsive to the print mode setting unit setting the mirror image printing mode and the determining unit failing to determine that the printing medium loaded is suitable for the mirror image printing to prohibit the printing unit from printing the first information. The printer may further comprise an alarm unit, responsive to the printing mode setting unit setting the mirror image printing mode and the determining unit failing to determine that the printing medium loaded in the printer is suitable for the mirror image printing, for generating an alarm message that the printing medium loaded is unsuitable for the mirror image printing.

The printer may further comprise an input unit that inputs and sets data on the kind of the printing medium loaded in the printer; and a determining unit that determines based on the data on the kind of the printing medium set by the input unit whether the printing medium loaded is suitable for the mirror printing, and wherein: the print controller is responsive to the print mode setting unit setting the mirror image printing mode and the determining unit determining that the printing medium loaded is suitable for mirror printing to control the printing unit so as to print the first information in the mirror and normal images.

In the printer, the print controller may be responsive to the print mode setting unit setting the mirror image printing mode and the determining unit failing to determine that the printing medium loaded is suitable for the mirror image printing to prohibit the printing unit from printing the first information. The printer may further comprise an alarm unit, responsive to the printing mode setting unit setting the mirror image printing mode and the determining unit failing to determine that the printing medium loaded in the printer is suitable for the mirror image printing, for generating an alarm message that the printing medium loaded is unsuitable for the mirror image printing.

The above and other objects, features and advantages of the present invention will become apparent in the following detailed description of the present embodiment and modifications thereof when read in conjunction with the accompanying drawings wherein the same reference numerals denote like or similar parts throughout the several views.

DETAILED DESCRIPTION OF THE EMBODIMENT

Figure 1:
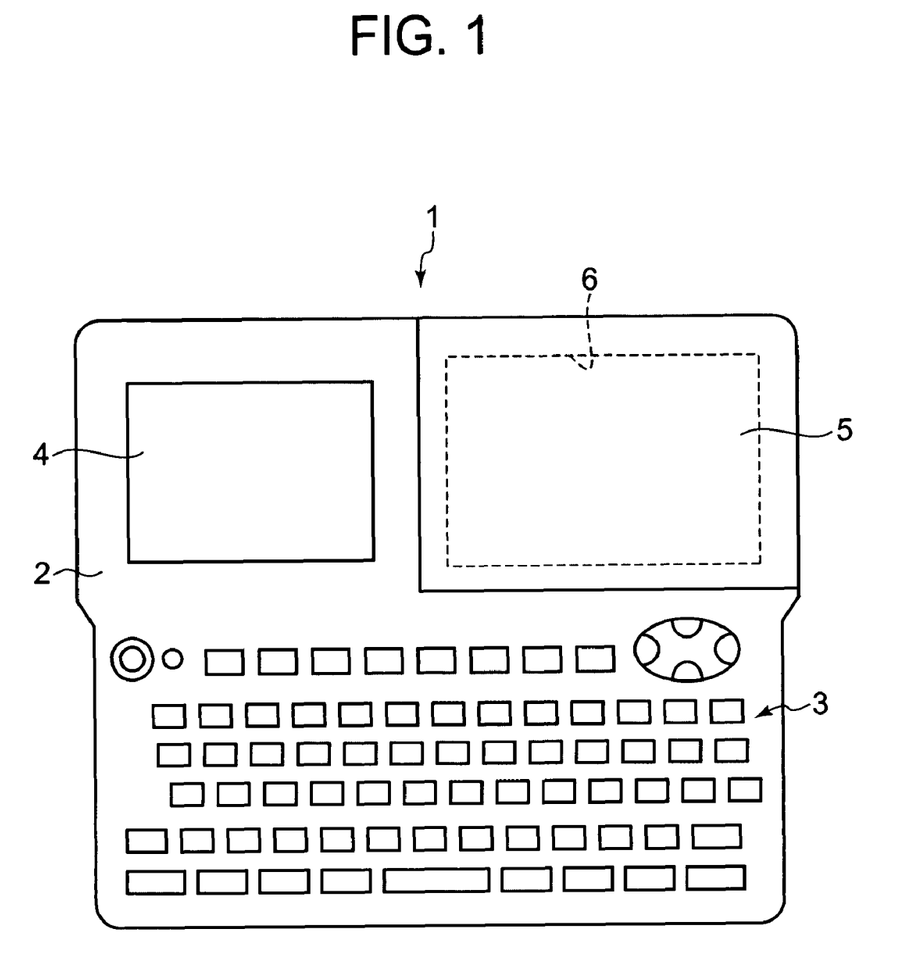
FIG. 1 is a plan view of a printer according to an embodiment of present invention.
Figure 2:
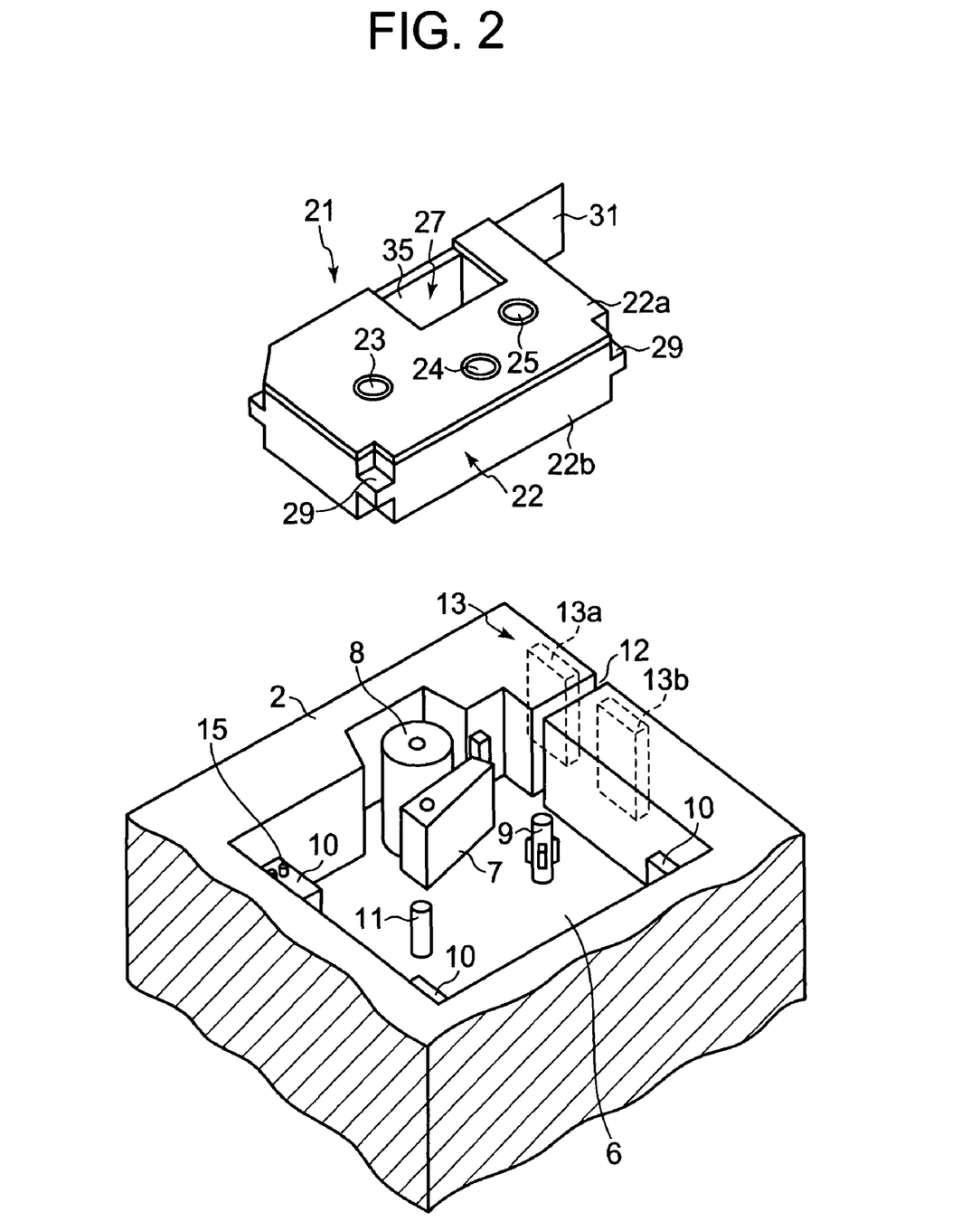
FIG. 2 is a perspective view of a tape cassette and a printer that uses the cassette where an internal structure of the printer is shown.

Referring to the accompanying drawings, an embodiment of a tape printer according to the present invention will be described. FIG. 1 is a plan view of the printer. FIG. 2 is a perspective view of a tape cassette and the printer that uses the cassette. As shown in FIGS. 1 and 2, the printer 1 has on the top of a body 2 thereof a key-in unit 3, a display 4, and an openable cover 5. The printer has a cassette loading section 6 where a tape cassette 21 that encloses a printing tape 31 and an ink ribbon 35 can be loaded when the cover 5 is open.

The key-in unit 3 comprises character keys used to input character information, a printing mode key used to set a normal image printing mode or a mirror image printing mode, a print key used to give a print start command, a cursor key unit used to move a cursor on a display screen of the display 4, and other keys used to edit inputted character information, and to perform various setting processes and a printing process. The display 4 includes a liquid crystal display that displays keyed-in character information, menu pictures to be selected for various setting operations, messages on various processing operations and other various information including the length of a label to be printed on the printing tape 31, a printing mode set at present, etc.

The cassette loading section 6 includes a thermal (printing) head 7 with a plurality of heaters arranged in a straight line in a vertical direction to print information on the printing tape 31, a platen roller 8 that conveys the printing tape 31 and an ink ribbon 35 held between the platen roller 8 and the thermal head 7, and a ribbon winding shaft 9 that rewinds around it a used portion of ink ribbon 35 within the tape cassette 21. The printing tape 31 and the ink ribbon 35 are conveyed by the platen roller 8 in the horizontal direction with the tape and ribbon sides upright. Thus, the plurality of heaters of the thermal head 7 provided so as to extend across the tape 31 and the ribbon 35 are driven to print information on the tape 31 along its length while the tape is being conveyed.

The loading section 6 also has four cassette supports 10 provided each at a predetermined height at a respective one of the four corners of the cassette loading section 6 to receive thereon and position a tape cassette 21. It also has a shaft 11 that is fitted into the tape cassette 21 to position the same. The loading section 6 is open through a tape path 12 in a wall thereof to the outside to discharge a printed tape portion 31 to the outside. There is a cutter 13 comprising a fixed blade 13a and a movable blade 13b each provided on a respective one of both sides of the path exit so as to cut away the discharged printed tape portion. A plurality of tape cassette sensing switches 15 are provided on one of the four cassette corner supports 10 to sense the kind of tape cassette loaded on the cassette corner supports 10.

The tape cassette 21 comprises a cassette case composed of a cover 22a and an open box 22b within which a roll of tape 31 with a core 23, a roll of new ink ribbon 35 with a core 24, and a core 25 around which a used portion of the ink ribbon 35 is to be wound are enclosed. The cassette case 22 has a cavity 27 on a side thereof that receives the thermal head 7 when the tape cassette 21 is loaded in the cassette loading section 6. The cassette case 22 has four engagement corners 29 that are engaged with the corresponding corner supports 10 of the cassette when the cassette is loaded in the loading section 6.

One of the engagement corners 29 which will be engaged with the cassette corner support 10 with the plurality of sensing switches 15 has an identifier of a shape corresponding to the kind of printing tape 31 enclosed within the cassette case 22. The identifier selectively actuates the plurality of sensing switches 15 such that the kind of tape cassette 21 loaded in the cassette loading section 6 and hence the kind of printing tape 31 enclosed within the tape cassette 21 are determined based on information obtained from the tape cassette sensing switches 15.

The printing tapes 31 to be used in this printer 1 include a general printing tape and a lettering (or transfer) tape. The tape cassette 21 includes a general tape cassette that encloses either the general printing tape or a transfer tape cassette that encloses the transfer tape. The general printing tape is a lamination of a printing tape layer, an adhesive layer, and a separable protective tape layer adhered together in this order. Information is printed in a normal image onto the general printing tape with the ink ribbon and the printed portion of the tape is then cut away, thereby forming a label, whose separable layer is then removed and adhered to an object. The transfer tape enclosed within the transfer tape cassette has a surface processed with silicon on which information can be printed in a mirror image with the ink ribbon. When the transfer tape on which the mirror image is printed is placed in contact with an object and then pressure is added or heat is applied to the tape from behind, the mirror image printed on the silicon layer is transferred to the object in the normal image.

As described above, the printer 1 is capable of printing a normal image on a general printing tape with an ink of the ink ribbon and a mirror image on a transfer tape with an ink of the ink ribbon. The general and transfer tape cassettes have identifiers different in shape such that they can be identified from each other when they are loaded individually in the loading section of the printer 1. Assume now that the number of tape cassette sensing switches 15 is, for example, two. Further assume that when a general tape cassette is loaded in the cassette loading section 6, one and the other of the switches are turned on and off, respectively, with the identifier of the general tape cassette and that when a transfer tape cassette is loaded, the one and the other of the switches are turned off and on, respectively. Thus, in the printer 1, sensed information on operation of these switches allows the kind of tape of the tape cassette 21 loaded to be determined.

When a tape cassette 21 is loaded in the loading section 6 in this printer 1 and a print command is given, parts of the printing tape 31 and ink ribbon 35 are drawn out from the tape cassette 21 and then conveyed through between the platen roller 8 and the thermal head 7 while being held between these members in a superimposed manner. Simultaneously, print data is fed line by line to the thermal head 7, its heaters are driven to produce heat based on the print data, and then ink of the ink ribbon 35 is transferred thermally to the printing tape 31, thereby printing the data on the tape. A used portion of the ink ribbon 35 is moved wound into the tape cassette 21 to be wound around the winding shaft 9 and then the printed tape portion 31 is discharged through the path exit to the outside of the printer body 2. When the printing is terminated, the movable cutter blade 13b is moved against the fixed blade 13a to cut away the printed tape portion 31.

Figure 3:
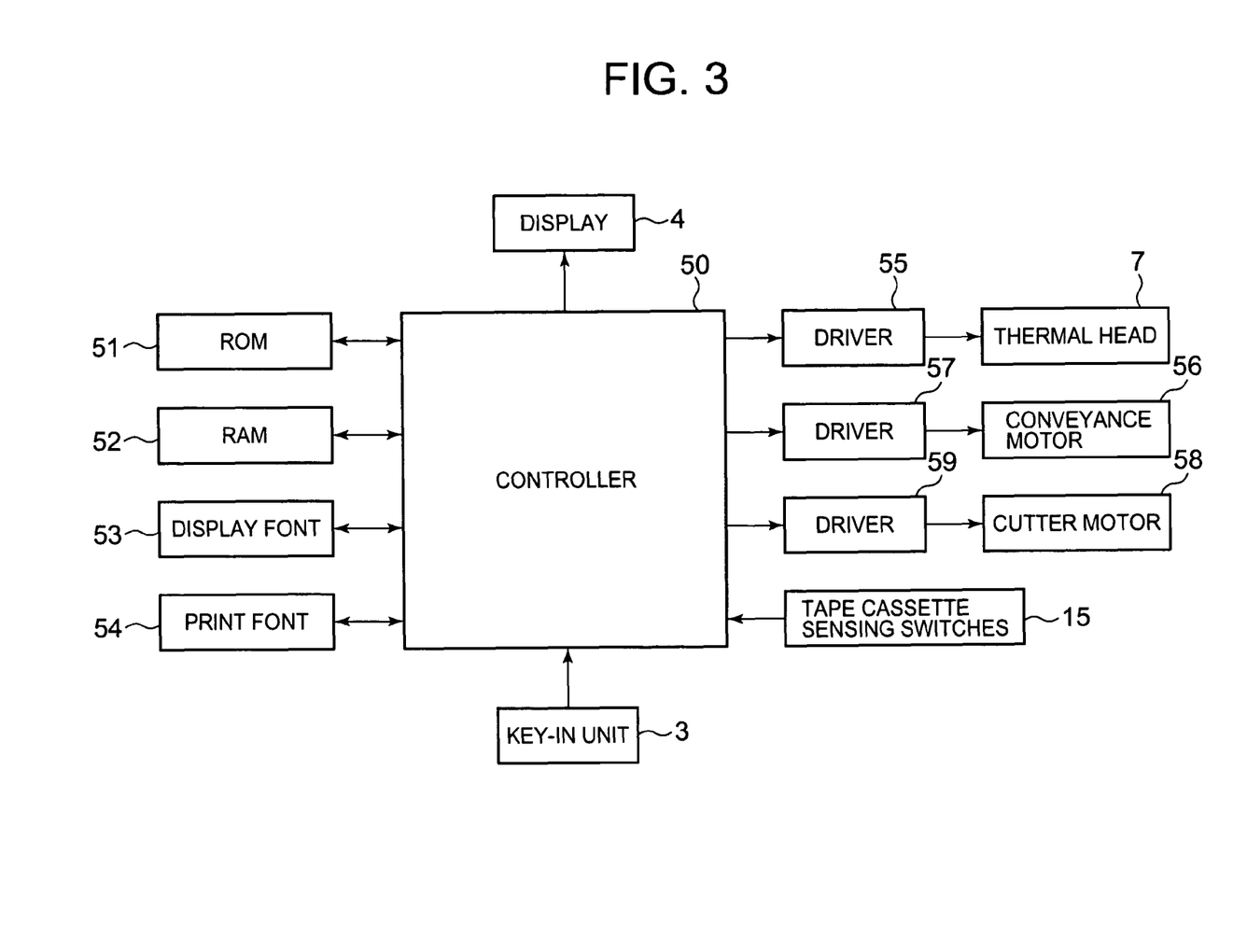
FIG. 3 is a block diagram of an electronic circuit for use in the printer.

FIG. 3 is a block diagram of an electronic circuit of the printer. As shown, the electronic circuit comprises a controller 50 composed of a CPU (Central Processing Unit). The controller 50 reads and starts up a system program stored in a ROM (Read Only Memory) 51 in accordance with a key operation signal from the key-in unit 3 and controls operation of the respective circuit elements concerned using a RAM (Random Access Memory) 52 as a working memory. The controller 50 is connected to the key-in unit 3, the ROM 51, the RAM 52, a display font ROM 53 that has stored display character fonts, a printing font ROM 54 that has stored printing character fonts, a driver 55 that drives the thermal head 7 based on print data to produce heat, a driver 57 that drives a conveyance motor 56 composed of a step motor that drives the platen roller 8 and the ribbon winding shaft 9, a driver 59 that drives a cutter motor 58 that in turn actuates the cutter 13, and the display 4 that displays inputted character information. The controller 56 is also connected to the tape cassette sensing switches 15 that sense the kind of a tape enclosed within the tape cassette 21.

The ROM 51 also has stored a program that converts character information received from the key-in unit 2 to dot pattern data of a symbol image. The two-dimensional codes include, for example, QR (Quick Response) codes, PDF417 codes, DataMatrix and Max Codes. The ROM 51 also has stored a program that controls the printer 1 appropriately so as to print character information or a symbol image of two-dimensional codes or barcodes in a normal image or in a mirror image.

The RAM 52 also includes an input data memory that stores character information data received from the key-in unit, a print data memory in which received character information/pattern data of a symbol image of two-dimensional codes or barcodes is loaded and stored, a display data memory that stores pattern data to be displayed on the display 4, and registers/counters that temporarily store data required in the printing process.

As described above, the printer has the normal image printing mode in which characters and images are printed in the normal image and the mirror image printing mode in which the characters and images are printed in the mirror image. In printing, the user selects one of these modes.

The printing process to be performed by the printer will be described with reference to the flowcharts of FIGS. 4-6 and examples of printing in FIGS. 7 and 8. First, the display 4 displays a printing mode setting picture on which the user selectively sets the normal image printing mode for printing characters/images in the normal image on a general printing tape and the mirror image printing mode for printing the characters/images in the mirror image on a transfer tape (step S1).

Then, the display 4 displays a printing format setting picture on which the user selects a desired one from among three printing formats in each of which information is printed, i.e., printing of only a symbol image of two-dimensional codes, printing of a combination of a symbol image of two-directional codes and character information, and printing of only character information (step S2).

Then, the display 4 displays a picture on which the information to be printed can be inputted and edited. The user keys in information to be printed at the key-in unit 3. When the printing format involving the printing of only a symbol image of two-directional codes is set in step S2, character information to be converted to a symbol image of two-dimensional codes is inputted. When the printing format involving the printing of a combination of a symbol image of two-directional codes and character information is selected, character information to be converted to a symbol image of two-directional codes and character information to be printed together with the former character information are inputted. Both these items of information can have the same content. In this case, only one of these items of information may be inputted. When the printing format involving the printing of only a character string is set in step S2, the character information to be printed is inputted (step S3). Then, the display 4 displays a print number setting picture where the user can set the number of images to be printed (step S4).

When the user gives a command to start printing by operating the print key (step S5), it is determined whether the set printing mode is the normal image printing mode (step S6). If so, it is then determined based on information sensed by the tape cassette sensing switches 15 whether a general tape cassette that has enclosed a normal printing tape corresponding to the normal image printing mode is loaded in the cassette loading section 6 (step S7). If so, the information is printed on the general printing tape of the general tape cassette in the normal image printing mode (step S8), which will be described later in greater detail with reference to FIG. 5. When no general tape cassette is loaded in step S7, an error message is displayed on the display 4, advising the user that the tape cassette loaded is not suitable for the printing mode (step S9) because the general printing tape corresponds to the normal image printing mode and a printing tape of another type (here, transfer tape) does not. In this case, the printing operation of the printer 1 is prohibited and terminated without printing any information on the transfer tape.

When it is determined in step S6 that the set printing mode is not the normal image printing mode but the mirror image printing mode, it is then determined based on the information detected by the tape cassette sensing switches 15 whether a transfer tape cassette that has enclosed a transfer tape corresponding to the mirror image printing mode is loaded in the cassette loading section 6 (step S10). If so, a printing process is performed on the transfer tape in the mirror image printing mode (step S11), which will be described in greater detail later in FIG. 6. When it is determined that no transfer tape cassette is loaded, an error message is displayed on the display 4, alerting the user to the fact that the tape cassette loaded is not suitable for the printing mode (step S12) because the mirror printing mode corresponds to the transfer tape and not to the general printing tape. In this case, the printer 1 is prohibited from performing its printing operation and terminates its operation without printing any information on the tape.

The printing operation of the printer 1 on a general printing tape in the normal image printing mode in the FIG. 4 step S8 will be described with reference to FIG. 5. In this printing process, first, it is determined whether the printing format set in step S2 involves the printing of only a symbol image of two-dimensional codes (step S801). If so, the character information inputted in step S3 is converted to dot pattern data of a symbol image (step S802).

Then, the thermal head 7 is driven based on this dot pattern data, thereby printing the two-directional code symbol image in the normal mode on the general printing tape (step S803). When this symbol image has been printed, the number of images printed is incremented by one (step S804) and then it is determined whether a count indicative of the number of images printed has reached the number of images set in step S4 (step S805). If not, the processing of steps S803-S805 is iterated. If so, the cutter 13 is driven to cut away a printed portion of the tape, thereby producing a label (step S806).

When it is determined in step S801 that the set printing format does not involve the printing of only a symbol image of two-directional codes, it is then determined whether the set printing format involves the printing of a combination of a symbol image of two-dimensional codes and character information (step S807). If so, character information inputted in step S3 is converted to dot pattern data of a two-dimensional code symbol image, and dot pattern data of the character information to be combined with the two dimensional code symbol image is produced (step S808). Then, the thermal head 7 is driven based on these data to print a corresponding two-dimensional code symbol image and character string in the normal mode on the general printing tape (step S809).

Each time the printing is terminated in step S808, the number of images printed is incremented by one (step S810). Then it is determined whether the count has reached the set number (step S811). If not, the processing of steps S809-811 is iterated. Thus, when the count reaches the set number, the cutter 13 is driven to cut away a printed portion of the printing tape (step S806).

When the determination in any one of steps S801 and S807 is negative, the set printing format involves the printing of only character information. Thus, dot pattern data of the character information inputted in step S3 is produced (step S812). Then, the thermal head 7 is driven based on the dot pattern data of the character information produced in step S812, thereby printing a corresponding character string in the normal image on the general printing tape (step S813). Each time such printing is terminated, the number of images printed is incremented (step S814). Then, it is determined whether the number of images printed has reached the set number of images printed (step S815). If not, printing of the character information in the normal image is iterated. Thus, when the count has reached the set number, the cutter 13 is actuated to cut away a printed portion of the tape (step S806).

Figure 5:
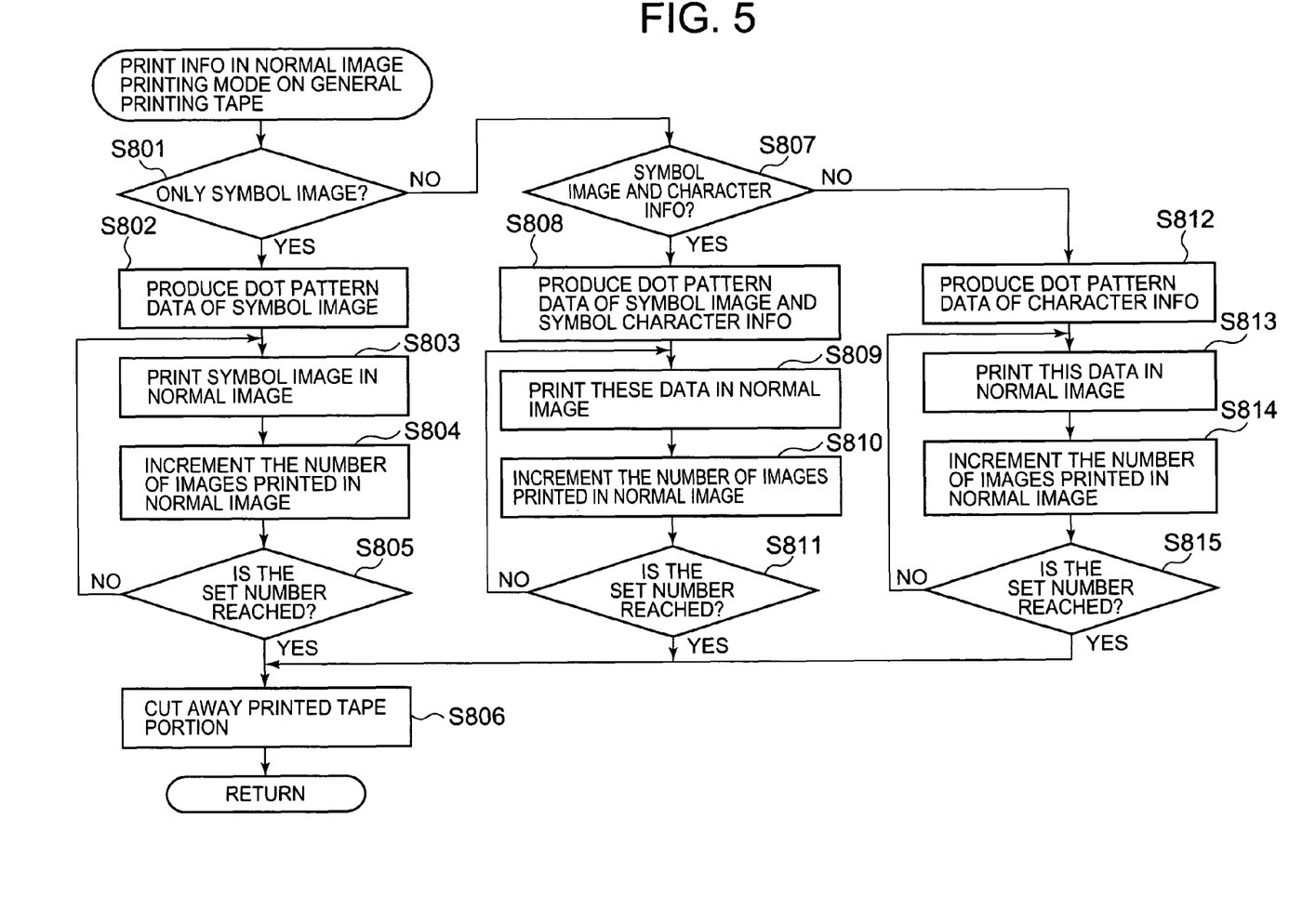
FIG. 5 is a flowchart of a printing process in a normal image printing mode to be performed by the printer.

FIG. 7 shows several examples of an image printed on a portion (or label) 31*a* of the general printing tape in the normal image printing mode of FIG. 5. FIG. 7A shows an example of a printed image obtained when the set printing format involves the printing of only a two-dimensional code symbol image and the number of images to be printed is set to 1. A single two-dimensional code symbol image 40*a* is printed in a single normal image on a portion 31*a* of the general printing tape. FIG. 7B shows an example of a printed image obtained when the set printing format involves the printing of a combination of a two-dimensional code symbol image and character information, and the number of images to be printed is set to 1. This piece of the general printing tape 31*a* has a single two-dimensional code symbol image 40*a* and a single character string 41*a* printed in the normal image.

Figure 7A:
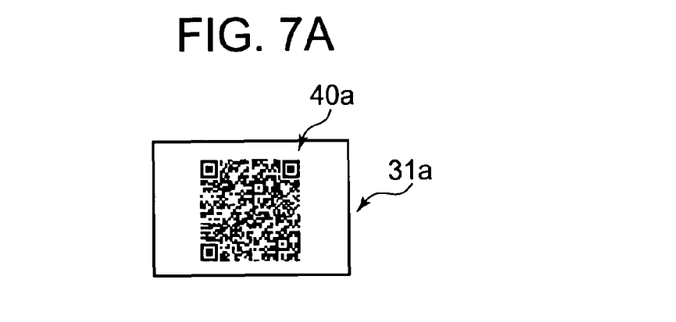
FIG. 7 illustrates several examples of an image printed in the normal image printing mode.
Figure 7B:
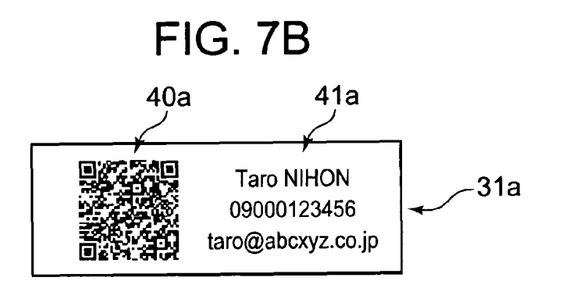
Figure 7C:
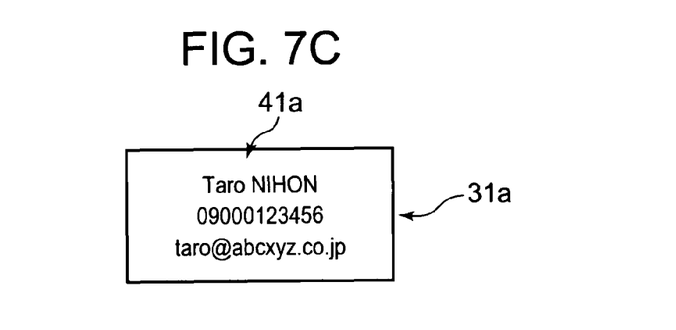
Figure 7D:
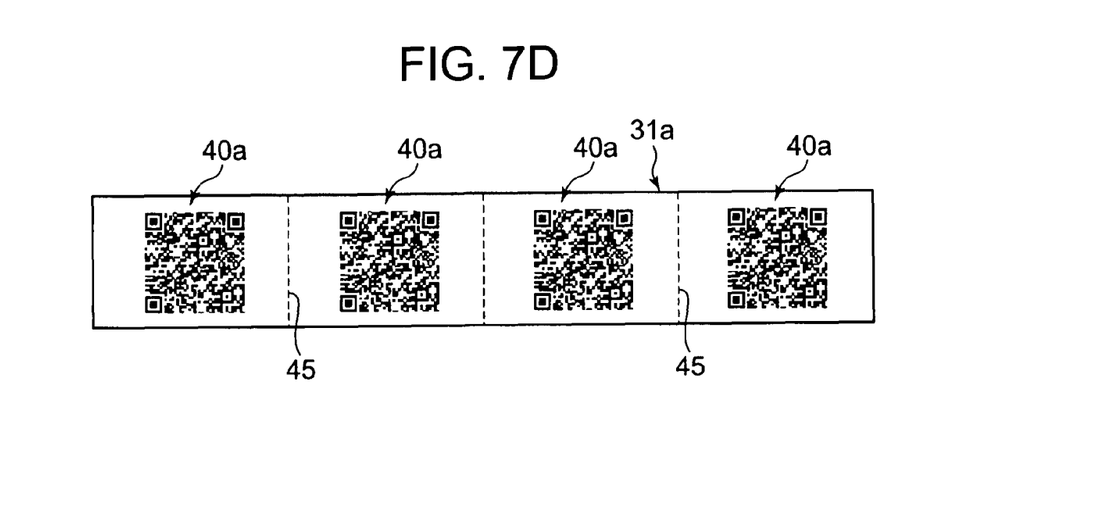

FIG. 7C is an example of a printed image obtained when the set printing format involves the printing of only character information and the number of images to be printed is set to 1. A piece of the general printing tape 31*a* has a single character string 41*a* printed in the normal image. FIG. 7D shows an example of a printed image obtained when the set printing format involves the printing of a two-dimensional code symbol image and the number of images to be printed is set to 4. A piece of the general printing tape 31*a* has four two-dimensional code symbol images 40*a* printed successively in the normal image and having a broken dividing line 45 between each printed image, thereby forming four labels of image. FIG. 7 illustrates that each printed symbol image 40*a* is made of two-dimensional codes to which the character string 41*a* "Taro NIHON, 09000123456, taro@bcxyz.co.jp" is converted and hence has the same content as the character string 41*a*.

Figure 6:
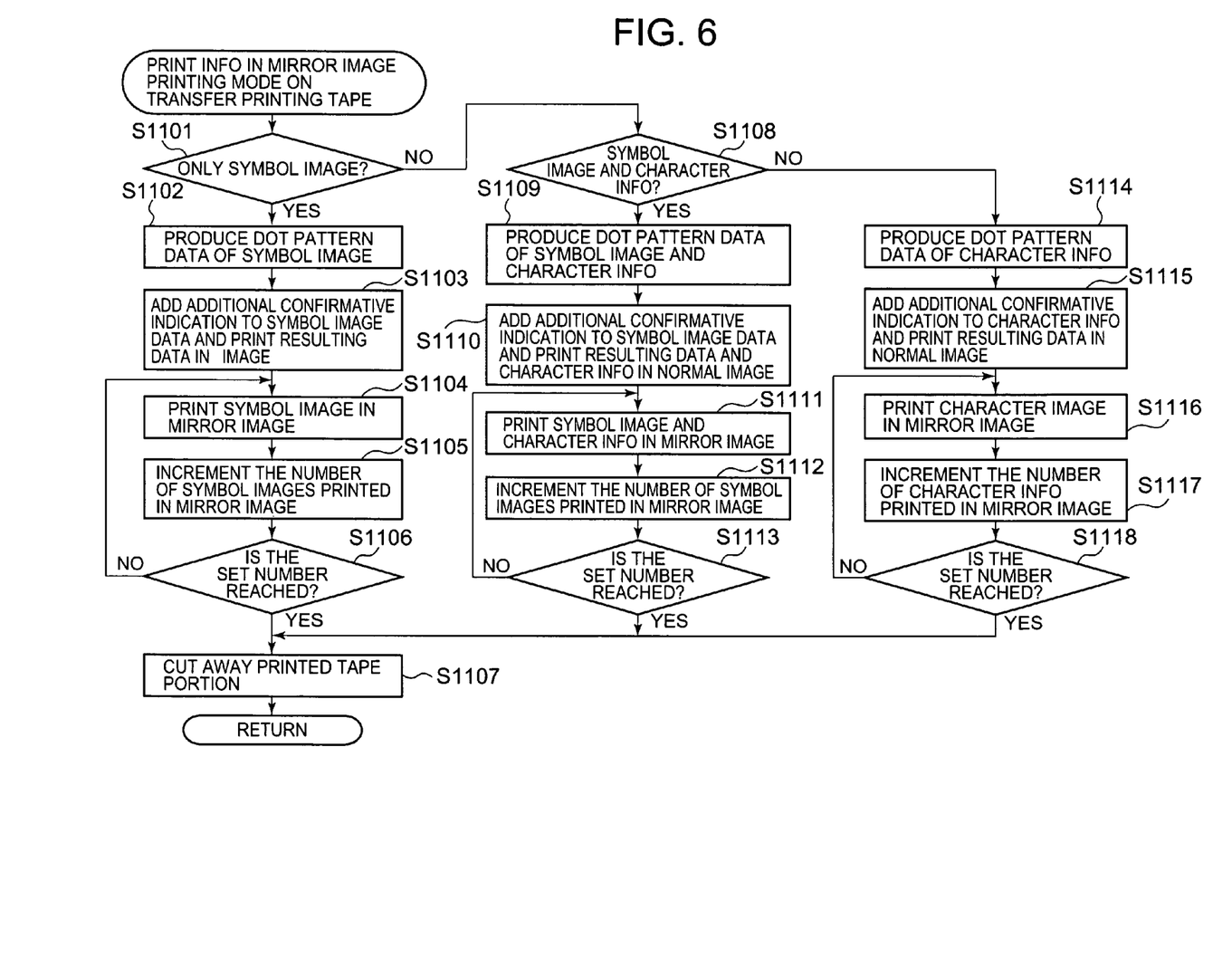
FIG. 6 is a flowchart of a printing process in a mirror image printing mode to be performed by the printer.

Referring to FIGS. 6 and 8, printing of a symbol image/character string in the mirror printing mode on a transfer tape as shown in step S11 of FIG. 4 will be described. In this process, it is first determined whether the set printing format involves the printing of only a symbol image of two-dimensional codes (step S1101). If so, the character information inputted in step S3 is converted to dot pattern data of a symbol image of two-dimensional codes (step S1102). Dot pattern data of additional confirmative indication "CONF" is added to the dot pattern data of the two-dimensional code symbol image and resulting composite dot pattern data is supplied line by line to the thermal head 7, thereby driving the same to print a corresponding two-dimensional code symbol image with the additional confirmative indication "CONF" in the normal image on the transfer tape (step S1103).

Figure 8A:
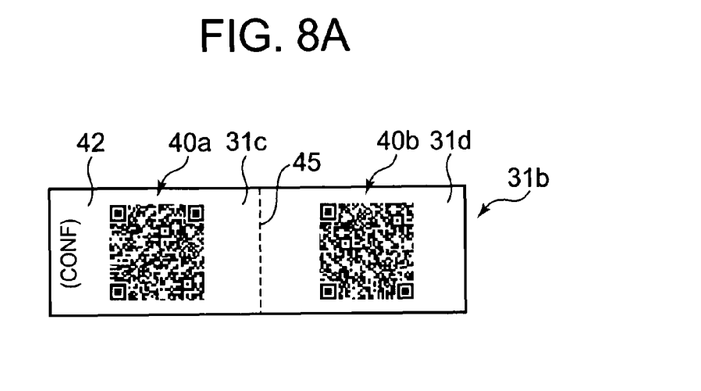
FIG. 8 illustrates several examples of an image printed in the mirror image printing mode.

When this printing is terminated, the dot pattern data of the two-dimensional code symbol image produced in step S1102 is inverted (upside down) line by line and then supplied to the thermal head 7. Then, the thermal head 7 prints these data sequentially, thereby forming the two-dimensional code symbol image in the mirror image in a printing area of the transfer tape next to its area where the symbol image is printed in the normal image in step S1103 (step S1104). In this case, the symbol image is printed based on the dot pattern data produced in step S1102 with no confirmative indication printed in the area for the mirror image. When this printing of the two-dimensional code symbol image in the mirror image is terminated, the number of images printed in the mirror image is incremented (step S1105). Then, it is determined whether the count has reached the number of images set in step S4 (step S1106). If not, printing of the two-dimensional code symbol image in the mirror image is iterated. When the count reaches the set number, a printed portion of the transfer tape is cut away by the cutter 13 (step S1107). FIG. 8A illustrates an example of only a two-dimensional code symbol image printed on a transfer tape in the mirror image printing mode.

When it is determined in step S1101 that the set printing format does not involve the printing of only a two-dimensional code symbol image, it is then determined whether the set printing format involves the printing of a combination of a two-dimensional code symbol image and character information (step S1108). If so, the character information inputted in step S3 is converted to dot pattern data of a two-dimensional code symbol image and of character information to be combined with the two-dimensional code symbol image (step S1109). Then, dot pattern data of an additional confirmative indication is added to the dot pattern data of the symbol image produced in step S1109. Then, these dot pattern data are combined and resulting dot pattern data is supplied line by line to the thermal head 7, thereby driving the same so as to print on the transfer tape a corresponding two-dimensional code symbol image, character string, and additional confirmative indication in a normal image (step S1110).

Figure 8B:
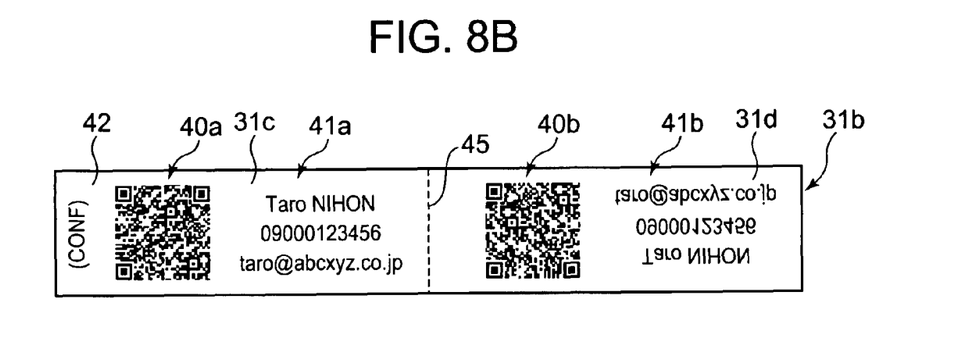

When this printing is terminated, the dot pattern data of the two-dimensional code symbol image produced in step S1109 and of the character image combined with the symbol image is inverted (upside down) line by line and then supplied to the thermal head 7, which prints these data sequentially on the transfer tape, thereby forming a combined two-dimensional code symbol image and character string in a printing area of the transfer tape next to its area where the combined symbol image, character string and additional confirmative indication is printed in the normal image (step S1111). In this case, no additional character information "CONF" is printed in the mirror image area. When this mirror image printing is terminated, the number of images printed in the mirror image is incremented (step S1112). Then, it is determined whether the count has reached the set number (step S1113). If not, the mirror image printing is iterated. FIG. 8B shows an example of combination of a two-dimensional code symbol image and character string printed on a transfer tape in the mirror image printing mode.

When the determination in each of steps S1101 and S1108 is negative, the set printing format involves the printing of only character information. Thus, dot patter data of the inputted character information is produced (step S1114). Then, dot pattern data of the additional confirmative indication is added to the dot pattern data of the inputted character information and resulting dot pattern data is supplied line by line to the thermal head 7, thereby driving the same so as to print a corresponding character string and additional confirmative indication in the normal image on the general printing tape (step S1115). Then, the dot pattern data of the character information produced in step S1114 is inverted (upside down) line by line and then supplied to the thermal head 7, which prints a corresponding character string in the mirror image in a printing area of the transfer tape next to its area where the character string is printed in the normal image (step S1116). In this case, no additional confirmative indication "CONF" is printed in the mirror image area.

Figure 8C:
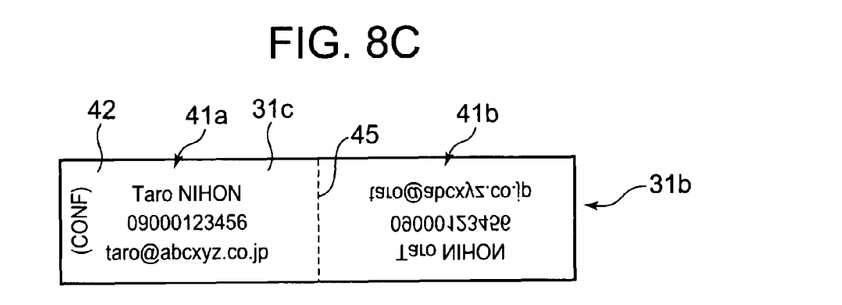

Each time this mirror image printing is terminated, the number of images printed in the mirror image is incremented (step S1117). Then, it is determined whether the count has reached the set number (step S1118). If not, the mirror image printing is iterated in steps S1116-S1118. When the count reaches the set number, a printed portion of the transfer tape is cut away by the cutter 13 (step S1107). FIG. 8C illustrates an example of a character string printed on a transfer tape in the mirror image printing mode.

Figure 8D:
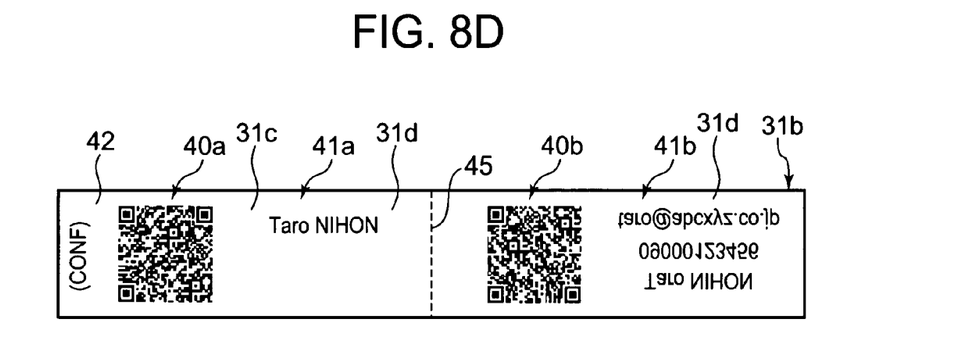

FIGS. 8A-8F illustrate various examples of an image printed in the mirror image printing mode on the transfer tape. FIG. 8A shows an example of an image printed when the set printing format involves the two-dimensional code symbol image. FIG. 8B shows an example of an image printed when the set printing format involves the printing of a combination of a two-dimensional code symbol image and character information. FIG. 8C is an example of a printed image obtained when the set printing format involves the printing of only character information. Any of FIGS. 8A-8C also shows that the number of images to be printed is set to one in step S4 of FIG. 4. FIG. 8 also illustrates that the two-dimensional symbol image 40a is made of two-dimensional codes to which character information 41a "Taro NIHON, 09000123456, taro@abcxyz.co.jp" is converted and then that a part of the character image to be printed in the normal image is omitted. FIG. 8D shows that part of the character information is not printed.

Referring to FIGS. 8A-8C, a two-dimensional code symbol image 40a and/or character string 41a are printed in the normal image in a left-hand or normal image printing one 31c of two areas into which a piece of transfer tape 31b is divided by a broken line 45 and a two-dimensional code symbol image 40b and/or a character string 41b are printed in the mirror image in the right-hand or mirror image printing one 31d of the two areas. The image of the right-hand mirror image area 31d printed in the mirror image is used in itself for transferring purposes and the image of the left-hand area 31c printed in the normal image is used to confirm the content of the right-hand area image because the content of this image printed in the mirror image on the transfer tape is difficult to confirm only by itself.

The additional confirmative indication "CONF" 42 shown on the left-hand side of the normal image printed in the left-hand area 31c should be used only for confirming the content of the image printed in the mirror image in the right-hand area 31d and represents that the normal image should not be used in itself for transferring purposes. Thus, the user can read the two-dimensional code symbol image printed in the normal image, for example, using the reading function of a mobile telephone, thereby confirming the content of the information contained in the symbol image printed in the mirror image. The additional character string may indicate a message alerting to the user that the image printed in the normal image cannot be used for transferring purposes.

FIGS. 8B and 8C each illustrate that the whole character string is printed both in the mirror image and in the normal image. FIG. 8D illustrates in its left-hand area that a part of the character string 41a is printed in the normal image, which is sufficient for confirming purposes Therefore, when, for example, an inkjet system is employed in the printing mechanism, the quantity of an image to be printed and hence the quantity of ink to be consumed are reduced. A part of the character string to be printed in the normal image may be selected by the user.

Figure 8E:
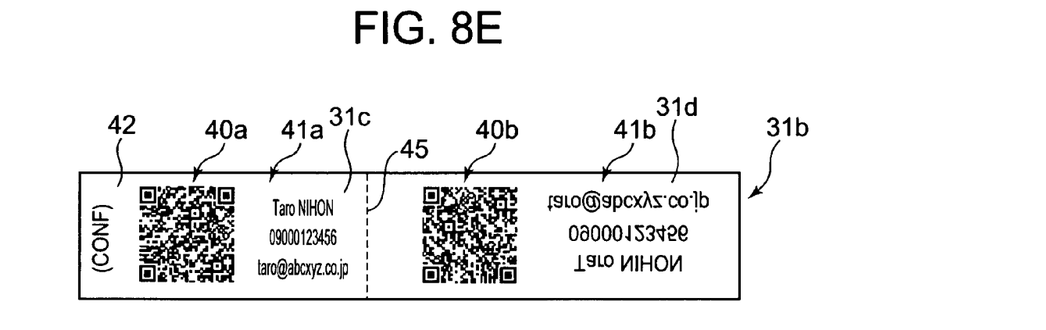

As shown in FIG. 8E, the confirmative normal image printing area 31c may be reduced compared to the mirror image printing area 31d and the character string 41a may be printed in a reduced size in the normal image printing area 31c because the confirmative normal image printing area is finally scrapped, thereby reducing a consumption of the printing medium economically.

Figure 8F:
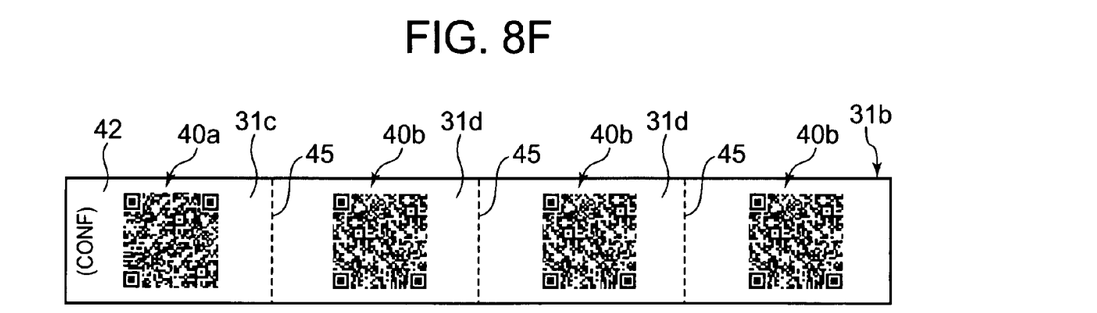

FIG. 8F illustrates an example of a print of three two-dimensional code symbol images obtained when the number of images to be printed is set to 3 in the mirror image printing mode. As will be obvious from this, when a plurality of images are printed in the mirror image, at least one normal image is printed. In FIG. 8F, the left-hand end area is a normal image printing area 31c on the right-hand side of which three mirror image printing areas 31d are arranged successively. A broken boundary line is printed between each printing area. When a plurality of two-dimensional code symbol images printed beforehand and collectively in the mirror image for transferring purposes, as shown in FIG. 8F, are sequentially transferred to respective objects concerned for use, the user can forget the content of these respective images are as time elapses. If a reader cannot read a two-dimensional code symbol image printed in the mirror image, the content of the symbol image cannot be confirmed. If a symbol image printed in the normal image for confirming purposes is available in such a case, the user can confirm the content of the image. The two-dimensional codes of FIGS. 7 and 8 are QR codes, but the present invention is also applicable in a case where symbol images of other types of two-dimensional codes are used, of course.

The dot pattern data produced in each of steps S802, S808 and S812 is for printing in the normal image, and can be supplied line by line to the thermal head 7, which then prints a corresponding image/character string on the tape in its longitudinal direction in the normal image in a respective one of the printing formats of FIG. 7. The dot pattern data produced in each of steps S1102, S1103, S1109, S1110, S1114 and S1115 is for printing in the normal image, and can be supplied line by line to the thermal head 7, which then prints a corresponding image/character string on the tape in its longitudinal direction in the normal image printing area 31c in a respective one of the printing formats of FIG. 8 In the mirror image printing, the dot pattern data for the normal image printing produced in each of steps S1102, S1109 and S1114 is inverted upside down line by line and then supplied to the thermal head to drive the same to print a corresponding symbol image/character string in the mirror image, as disclosed in U.S. Pat. No. 4,839,742.

In the mirror image printing, in addition to the use of the technique of this U.S. Patent an (upside-down) inverted version of dot pattern data for use in the normal image printing may be produced beforehand and then supplied to the thermal head 7.

Figure 4:
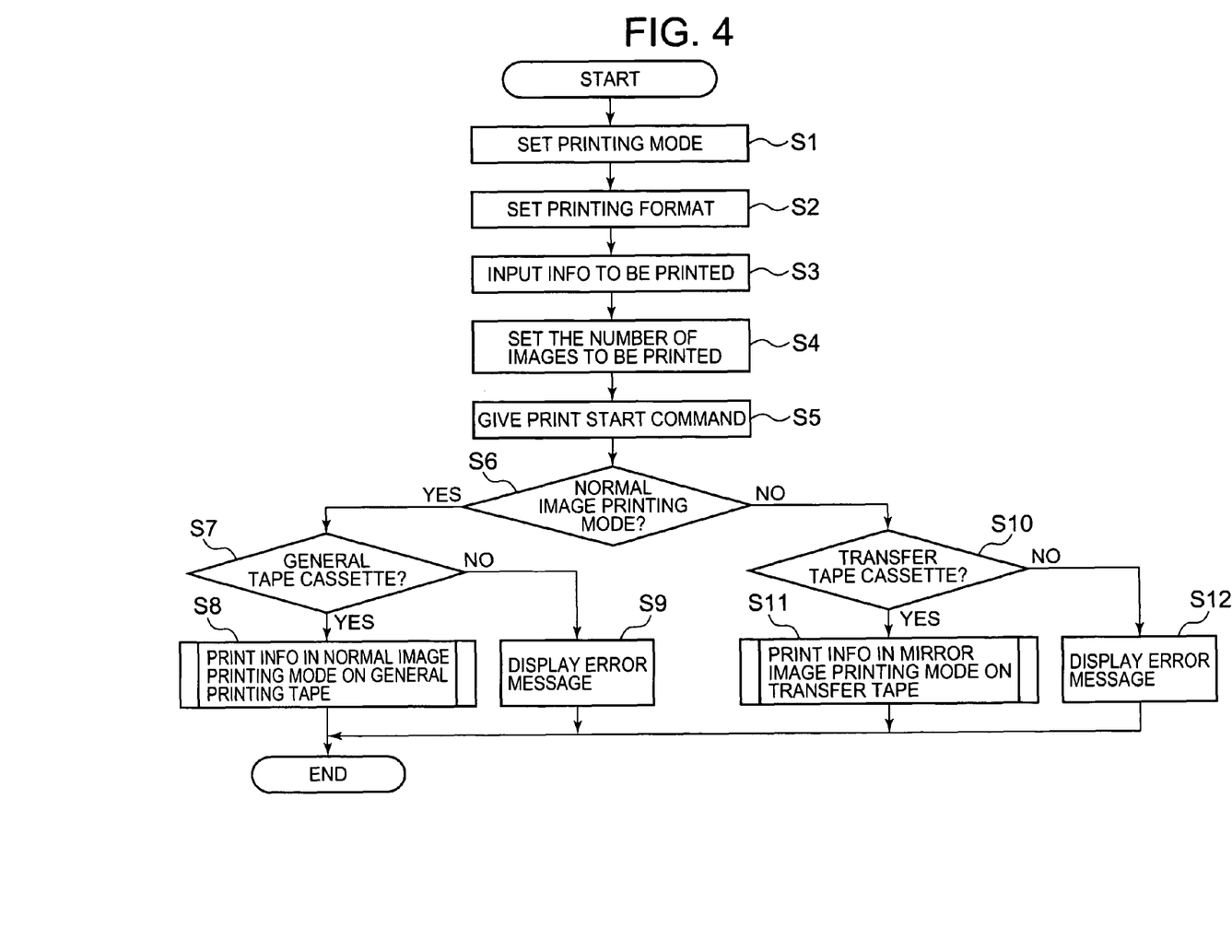
FIG. 4 is a flowchart of a printing process to be performed by the printer.

As described above, according to the printer of this embodiment, a two-dimensional code symbol image and character information are printed not only in the mirror image but also in the normal image in the mirror image printing mode in accordance with a single print command given by the user shown in step S5 of FIG. 4. Thus, the content of the symbol and character information printed in the normal image can be read and confirmed. Especially, when a plurality of two-dimensional code symbol images are printed successively in the mirror image, at least one symbol image is printed additionally in the normal image, thereby facilitating management of the images printed in the mirror image. By adding additional confirmative indication to the image printed in the normal image, the user can conveniently understand that the image printed in the normal image should be used only for confirming purposes.

While the present invention is illustrated as applied to the printer that prints two-dimensional codes, the present invention is applicable to printing of symbol images of other various types of two-dimensional codes as well as barcode symbol images in the mirror image. While the kind of a tape cassette loaded is illustrated as sensed by the tape cassette sensing switches 15, the user may input data on the kind of tape cassette at the key-in unit 3. For example, another step in which the user inputs and sets the kind of a tape cassette loaded in the loading section may be provided in FIG. 4, following setting the printing mode in step S1. In that step, the display 4 displays a setting picture on which the user can input and set the kind of the tape cassette. As just described, when the user selects a system for inputting and setting data on the kind of the tape cassette instead of the system for sensing the kind of the tape cassette with the tape cassette sensing switches 15, the controller 50 determines in step S7 of FIG. 4 whether the inputted and set data on the kind of the tape cassette indicates a general tape cassette or in step S10 of FIG. 4 whether the inputted and set data on the kind of the tape cassette indicates a transfer tape cassette.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2006-075540 filed on Mar. 17, 2006 and including specification, claims, drawings and summary. The disclosure of the above Japanese patent application is incorporated herein by reference in its entirety.

What is claimed is:

1. A printer comprising:
a printing unit that prints first information on a printing medium;
a print controller that controls the printing unit in accordance with a print command so as to print the first information in a mirror image and to also print at least part of the first information in a normal image; and
a print number setting unit that sets a number of items of first information to be printed;
wherein the print controller controls the printing unit to print the first information in the mirror image by the number of items of first information set by the print number setting unit, and to print at least one item of the first information in the normal image.

2. A printer comprising:
a printing unit that prints first information on a printing medium; and
a print controller that controls the printing unit in accordance with a print command so as to print the first information in a mirror image and to also print at least part of the first information in a normal image;
wherein the print controller adds to the first information to be printed in the normal image second information indicating that the first information to be printed in the normal image should be for confirming the content of the first information, and then causes the printing unit to print resulting information in the normal image.

3. A printer comprising:
a printing unit that prints first information on a printing medium; and
a print controller that controls the printing unit in accordance with a print command so as to print the first information in a mirror image and to also print at least part of the first information in a normal image;
wherein the print controller reduces a size of at least a part of the first information to be printed and causes the printing unit to print resulting information in the normal image in an area smaller than an area where the first information to be printed is printed in the mirror image.

4. The printer of claim 3, wherein the print controller causes the printing unit to print in the normal image the whole first information to be printed in the mirror image.

5. The printer of claim 3, wherein the print controller causes the printing unit to print in the normal image a part of the first information to be printed in the mirror image.

6. A printer comprising:
 a printing unit that prints first information on a printing medium; and
 a print controller that controls the printing unit in accordance with a print command so as to print the first information in a mirror image and to also print at least part of the first information in a normal image;
 wherein the first information to be printed includes a symbol image of predetermined codes, and wherein the print controller comprises:
  a dot pattern data producing unit that produces dot pattern data indicative of the symbol image of the predetermined codes;
  a data pattern data supply unit that supplies to the printing unit the dot pattern data produced by the dot pattern data producing unit; and
  an inverting unit that inverts the dot pattern data upside down when the dot pattern data is supplied by the data supply unit to the printing unit for mirror image printing.

7. A printer comprising:
 a printing unit that prints first information on a printing medium;
 a print controller that controls the printing unit in accordance with a print command so as to print the first information in a mirror image and to also print at least part of the first information in a normal image; and
 a printing mode setting unit that selectively sets one of a mirror image printing mode for mirror image printing and a normal image printing mode for normal image printing;
 wherein the print controller controls the printing unit in accordance with a print command when the mirror image printing mode is set by the printing mode setting unit to print the first information in the mirror and normal images, and controls the printing unit in accordance with a print command when the normal image printing mode is set by the printing mode setting unit to print the first information in the normal image.

8. The printer of claim 7, further comprising:
 a sensing unit that senses a kind of a printing medium loaded in the printer to cause the printing unit to print the first information on the printing medium; and
 a determining unit that determines based on information of the kind of printing medium sensed by the sensing unit whether the printing medium loaded in the printer is suitable for the mirror image printing;
 wherein the print controller, responsive to the print mode setting unit setting the mirror image printing mode and the determining unit determining that the printing medium loaded in the printer is suitable for the mirror printing, controls the printing unit to print the first information in the mirror and normal images.

9. The printer of claim 8, wherein the print controller, responsive to the print mode setting unit setting the mirror image printing mode and the determining unit failing to determine that the printing medium loaded in the printer is suitable for the mirror image printing, prohibits the printing unit from printing the first information.

10. The printer of claim 8, further comprising an alarm unit which, responsive to the printing mode setting unit setting the mirror image printing mode and the determining unit failing to determine that the printing medium loaded in the printer is suitable for the mirror image printing, generates an alarm message that the printing medium loaded in the printer is unsuitable for the mirror image printing.

11. The printer of claim 7, further comprising:
 an input unit that inputs and sets data indicating a kind of the printing medium loaded in the printer; and
 a determining unit that determines based on the data indicating the kind of the printing medium set by the input unit whether the printing medium loaded in the printer is suitable for the mirror printing;
 wherein the print controller, responsive to the print mode setting unit setting the mirror image printing mode and the determining unit determining that the printing medium loaded in the printer is suitable for mirror printing, controls the printing unit so as to print the first information in the mirror and normal images.

12. The printer of claim 11, wherein the print controller, responsive to the print mode setting unit setting the mirror image printing mode and the determining unit failing to determine that the printing medium loaded in the printer is suitable for the mirror image printing, prohibits the printing unit from printing the first information.

13. The printer of claim 11, further comprising an alarm unit which, responsive to the printing mode setting unit setting the mirror image printing mode and the determining unit failing to determine that the printing medium loaded in the printer is suitable for the mirror image printing, generates an alarm message that the printing medium loaded in the printer is unsuitable for the mirror image printing.

* * * * *